(12) United States Patent
Popescu et al.

(10) Patent No.: US 9,055,308 B2
(45) Date of Patent: Jun. 9, 2015

(54) METHOD AND SYSTEM FOR SCHEDULING COMMERCIAL ADVERTISEMENT

(75) Inventors: Andreea Popescu, Atlanta, GA (US); John David Ritsema, Marietta, GA (US); David James Benoit, Fayetteville, GA (US)

(73) Assignee: Turner Broadcasting System, Inc., Atlanta, GA (US)

( * ) Notice: Subject to any disclaimer, the term of this patent is extended or adjusted under 35 U.S.C. 154(b) by 0 days.

(21) Appl. No.: 13/271,718

(22) Filed: Oct. 12, 2011

(65) Prior Publication Data

US 2013/0097629 A1 Apr. 18, 2013

(51) Int. Cl.
*H04N 7/10* (2006.01)
*H04N 21/234* (2011.01)
*H04N 21/262* (2011.01)
*H04N 21/81* (2011.01)
*H04N 21/845* (2011.01)

(52) U.S. Cl.
CPC ... *H04N 21/23424* (2013.01); *H04N 21/26208* (2013.01); *H04N 21/812* (2013.01); *H04N 21/8455* (2013.01)

(58) Field of Classification Search
USPC .................................................. 725/32, 36
See application file for complete search history.

(56) References Cited

U.S. PATENT DOCUMENTS

| | | | |
|---|---|---|---|
| 6,947,450 B2 * | 9/2005 | Mangin | 370/537 |
| 8,544,036 B2 * | 9/2013 | Bollapragada et al. | 725/32 |
| 2003/0188308 A1 * | 10/2003 | Kizuka | 725/32 |
| 2007/0288979 A1 * | 12/2007 | Yen | 725/114 |
| 2008/0189178 A1 | 8/2008 | Schepers et al. | |
| 2008/0189734 A1 * | 8/2008 | Schepers et al. | 725/32 |
| 2010/0042496 A1 | 2/2010 | Wang et al. | |
| 2011/0078740 A1 | 3/2011 | Bolyukh et al. | |

OTHER PUBLICATIONS

International Search Report and the Written Opinion of the International Searching Authority, or the Declaration, in International application No. PCT/US12/59857, dated Jan. 4, 2013. (11 pages).

* cited by examiner

*Primary Examiner* — Olugbenga Idowu
(74) *Attorney, Agent, or Firm* — Arent Fox LLP (57) ABSTRACT

A method and system for scheduling commercial advertisement are described in which a data processing system having the spot scheduler solver may be operable to receive an advertiser's order to place advertisement or commercial spots into one or more commercial television breaks. The order may comprise various constraints and requirements corresponding to the spots. The spots may be assigned to inventory buckets within the commercial breaks based on the constraints and requirements. When a conflict arises, a prioritization scheme may be performed to complete the assignment of spots not assigned and to generate a commercial break schedule. The prioritization scheme may be based on spot arrival lead time or on maximizing the sum of the rates corresponding to the spots. The data processing system may maximize the spread of the spots over the commercial break schedule. The commercial break schedule may be adjusted when additional orders are received.

27 Claims, 7 Drawing Sheets

METHOD AND SYSTEM FOR SCHEDULING COMMERCIAL ADVERTISEMENT

CROSS-REFERENCE TO RELATED APPLICATIONS/INCORPORATION BY REFERENCE

Not Applicable.

FIELD OF TECHNOLOGY

Certain embodiments of the disclosure relate to placement of commercial advertisement spots into commercial breaks. More specifically, certain embodiments of the disclosure relate to a method and system for scheduling commercial advertisement.

BACKGROUND

The process of scheduling linear media advertisement spots into commercial breaks tends to be tedious, prone to errors, and incomplete. While some software products are available to receive an advertiser's order for the placement of spots into commercial breaks, these products either simply try to fill empty holes that exist within already scheduled commercial breaks on a first come, first placed basis, or do not address all requirements associated with the commercials. As a result, the software products currently available typically fail to honor all the constraints and requirements for each of the spots. In some instances, even after software products have been initially used, a majority of the spot placement has to be performed manually, leading to the errors and incomplete placements described above.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

A system and/or method is provided for scheduling commercial advertisement, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE DISCLOSURE

Certain embodiments of the invention may be found in a method and system for a scheduling commercial advertisement. Various embodiments of the invention provide for a data processing system, such as a television advertisement scheduling system, for example, which may comprise a spot scheduler solver that may be operable to receive an advertiser's order to place commercial advertisements or spots into one or more commercial breaks. The order received from the advertiser may comprise constraints, such as airing constraints, and placement requirements corresponding to the spots. The spots may be assigned to inventory buckets within the commercial breaks based on the constraints and placement requirements. When a conflict arises in the placement process, a prioritization scheme may be performed to complete the assignment of spots that are not assigned and to generate a commercial break schedule. The prioritization scheme may be based on spot arrival lead time or on maximizing the sum of the rates corresponding to the spots. The spot scheduler solver in the data processing system may maximize the spread of days in which the spots occur over the duration of the commercial break schedule. The commercial break schedule may be adjusted when additional orders are received.

The spot scheduler solver may be operable to honor the constraints and requirements of spots when placing them into commercial breaks. In this regard, the spot scheduler solver may re-shuffle spots that have been previously placed and any new spots during each run to place as many spots as possible in the commercial breaks while satisfying the constraints and requirements provided for the spots. The spot scheduler solver may utilize mathematical optimization models that take into account the constraints and requirements corresponding to a spot to optimize its placement.

Figure 1:
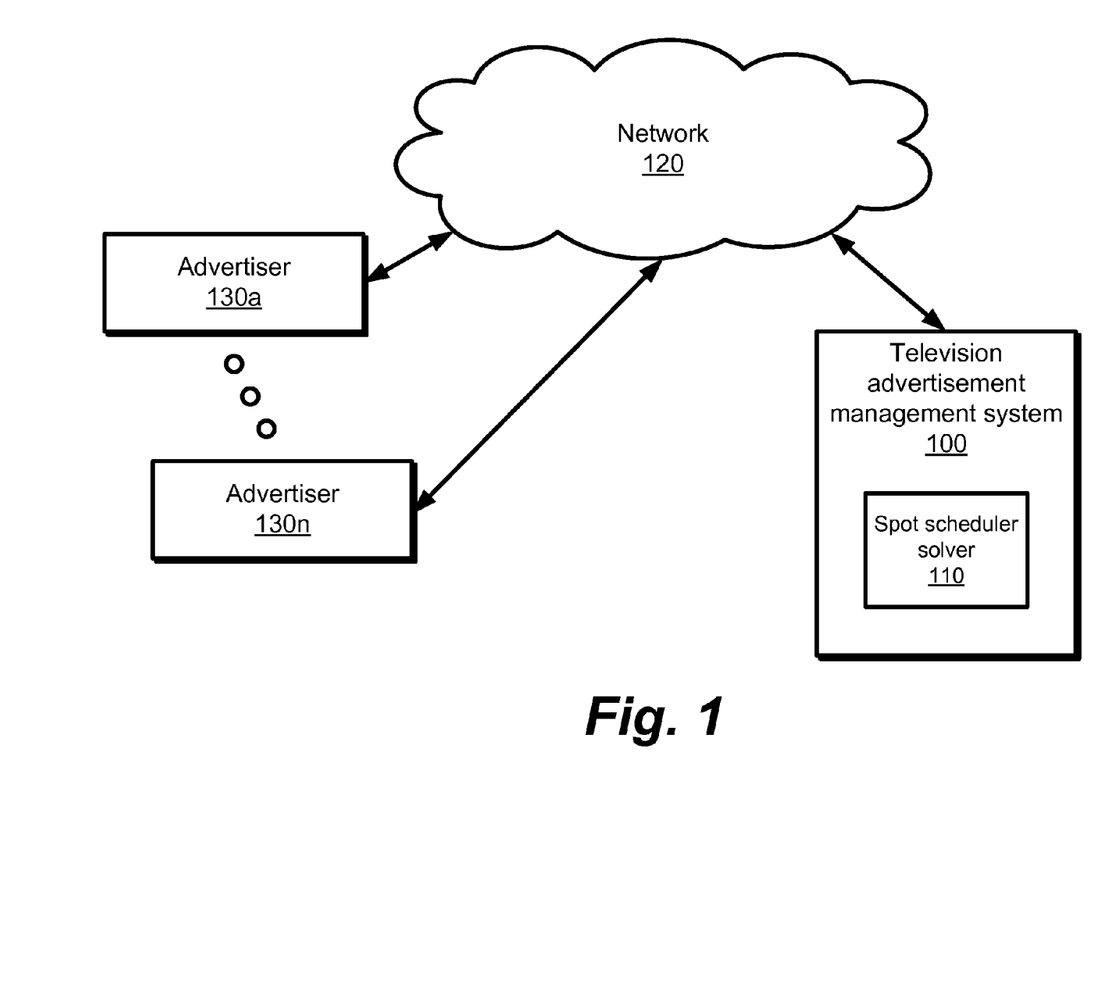
FIG. 1 is a block diagram that illustrates an exemplary system for receiving and processing spot scheduling orders, in accordance with an embodiment of the invention.

FIG. 1 is a block diagram that illustrates an exemplary system for receiving and processing spot scheduling orders, in accordance with an embodiment of the invention. Referring to FIG. 1, there is shown a television advertisement scheduling system 100 that is communicatively coupled to advertisers 130a, . . . , 130n through a network 120. The network 120 may be any kind of network, or a combination of various networks, and it is shown to illustrate the communication that may occur between the advertisers 130a, . . . , 130n and the television advertisement scheduling system 100.

The television advertisement scheduling system 100 may be operated by a broadcasting company and may comprise a spot scheduler solver 110. The spot scheduler solver 110 may comprise suitable logic, circuitry, code, and/or interfaces that may be operable to receive orders from one or more of the advertisers 130a, . . . , 130n to place advertisements spots into one or more commercial breaks that occur during television programming broadcast. That is, the spot scheduler solver 110 may be utilized to determine the appropriate scheduling of advertisement spots to produce a commercial break schedule according to the information provided by the advertisers 130a, . . . , 130n. The advertisers 130a, . . . , 130n may place orders with the broadcasting company that include information about the type of spots to be broadcast, the number of spots to be broadcast, and when should the spots be aired. The advertisers 130a, . . . , 130n may provide multiple orders, which need not be submitted at the same time. Therefore, the spot scheduler solver 110 may continuously receive orders with new or additional spots to be placed and may need to update any previously determined commercial break schedule to accommodate the constraints and requirements of those spots already placed and of the new spots being received.

The television advertisement scheduling system 100 may have a cutoff after which orders submitted by the advertisers 130a, . . . , 130n may not be considered by the spot scheduler solver 110 when preparing a next commercial break schedule. A commercial break schedule may include a final or complete schedule of the spots that are to appear during a specified period of television programming such as hours, days, weeks, or a combination thereof.

Figure 2:
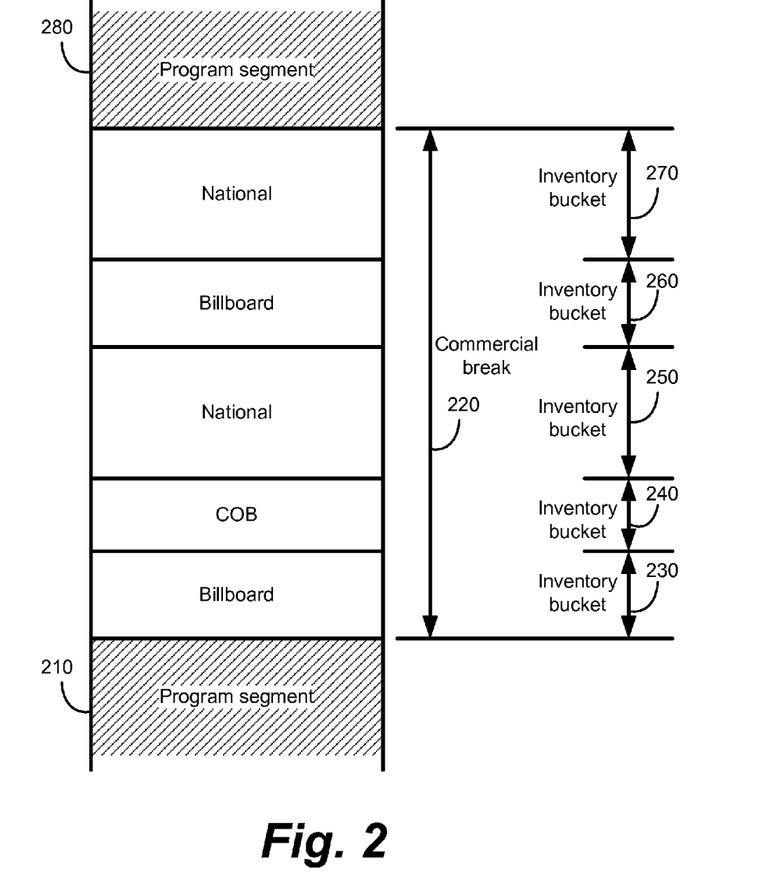
FIG. 2 is a diagram that illustrates an exemplary commercial break, in accordance with an embodiment of the invention.

FIG. 2 is a diagram that illustrates an exemplary commercial break, in accordance with an embodiment of the invention. Referring to FIG. 2, there is shown a commercial break 220 that occurs between a programming segment 210 and a programming segment 280. The commercial break 220 may comprise an inventory bucket 230 corresponding to a billboard inventory type, an inventory bucket 240 corresponding to a cable operator break (COB) inventory type, an inventory bucket 250 corresponding to a national inventory type, an inventory bucket 260 also corresponding to a billboard inventory type, and an inventory bucket 270 also corresponding a national inventory type. The inventory buckets 230, 240, 250, 260, and 270 shown in FIG. 2 may have different duration and may comprise one or more slots into which advertisement spots can be placed. The commercial break 220 and its corresponding inventory buckets are provided for purposes of illustration and not of limitation. During television programming, the duration, number, and/or type of inventory buckets in commercial breaks may vary.

The spot scheduler solver 110 described above may be operable to place one or more spots into the inventory buckets of commercial breaks such as the commercial break 220. In doing so, the spot scheduler solver 110 may solve the placement of incoming spots into open or available inventory buckets in accordance with the constraints and requirements of each spot. A commercial break, such as the commercial break 220, may comprise a set of characteristics that are taken into account by the spot scheduler solver 110. Those characteristics include, but need not be limited to, a network (e.g., TNT, TBS), a week/day/time of airing, an inventory type corresponding to each of the inventory buckets, a selling title, a franchise and title, and a position in the commercial break.

The network refers to the particular network that is delivering the linear media and the commercial spots. A programmer may operate more than one network and it may be necessary to indicate to which network is the spot assigned. The week/day/time of airing refers to the unique airing time of an inventory bucket, which his defined by week, day, and time. The inventory type refers to the type of content in a particular inventory bucket. As shown in FIG. 2, the different types of inventory include, but need not be limited to, national, billboard, and COB inventory types.

The selling title may refer to the program in which the inventory bucket airs (e.g., Friends, Seinfeld) or may be defined as a specific block of time (e.g., Prime time—usually 8-10 p.m., or Day Time—usually from 10 a.m. to 3 p.m.). In this regard, the inventory bucket typically inherits the selling title in which it is scheduled. The franchise and title may provide further detail to the selling title characteristic of the inventory bucket. For example, the inventory bucket may correspond to the selling title Daytime, the franchise "Married with children" and the title "Peggy gets a break." In this example, the inventory bucket may inherit the selling title as well as the franchise and title. The position in the commercial break may be used to define the sequencing or the order of the inventory buckets that belong to the same commercial break.

The spot scheduler solver 110 may match the characteristics of the inventory buckets in the commercial breaks with the constraints and requirements of each of the spots to be placed. The basic constraints corresponding to each spot include, but need not be limited to, a network, a selling title, an inventory type, an allowable week/day/time, and an advertiser conflict code. These constraints are substantially similar to the characteristics of the inventory buckets and are used to match the two. The advertiser conflict code refers to a conflict code that describes similar products or advertisers that are not to exceed a pre-determined number of occurrences in a commercial break. For example, the advertiser conflict code may indicate that no more than one automobile commercial is to be allowed in the same commercial break.

In addition to the basic constraints, each spot may have one or more placement requirements that are to be taken into account by the spot scheduler solver 110. These placement requirements may include, but need not be limited to, associative constraints, position constraints, time separation constraints, franchise and title exclusion constraints, and spot pinning constraints.

The associative constraints may include, but need not be limited to, a piggyback constraint, a bookend constraint, a sandwich bookend constraint, and an associated billboard constraint. The piggyback constraint refers to the placement requirement of having two spots of the same inventory type placed back-to-back in the same inventory bucket. The bookend constraint refers to the placement requirement of having two spots of the same inventory type air in the same inventory bucket with at least one spot in between the two. The sandwich bookend constraint refers to the placement requirement of having three spots of the same inventory type air in the same inventory bucket with at least one spot in between any two of them. The associated billboard constraint refers to the placement requirement of having one national and one billboard inventory type spots air adjacent to each other, that is, each may be placed in the corresponding inventory bucket, one at the bottom, and one at the top, such that they air immediately one after the other.

The position constraints may include, but need not be limited to, a break range constraint, a break position constraint, and an inventory bucket position constraint. The range constraint refers to the placement requirement of having a spot placed within a specific commercial break range, which may comprise a single commercial break or multiple commercial breaks. The break position constraint refers to the placement requirement of having a spot placed in the first position, the second position, the next to last position, or the last position in a commercial break. The inventory bucket position constraint refers to the placement requirement of having a spot placed in the first position, the second position, the next to last position, or the last position in an inventory bucket.

The time separation constraint may refer to an advertiser's placement requirement that some of the spots be aired at least a certain time apart. This placement requirement can be requested at the brand level. An advertiser may have one or more brands associated with it (e.g., Procter & Gamble's brands include Duracell, Tide, Folgers). In one example, the time separation constraint may require that spots from Procter & Gamble be separated by at least 30 minutes (advertiser level time separation), but spots from Procter & Gamble's Duracell brand be separated by at least 60 minutes (brand level time separation). In this example, all spots from the advertiser Procter & Gamble are separated by at least 30 minutes, and, in addition, the spots corresponding to the brand Duracell are separated by at least 60 minutes.

The franchise and title exclusion constraint may refer to the placement requirement that a spot have a corresponding list of one or more franchises and/or titles with which that spot is not allowed to air.

The spot pinning constraint may refer to the placement requirement in which a spot is forced or pinned to a specific slot in an inventory bucket. As long as the pinned spot does not violate constraints or requirements corresponding to the spot other than conflict code and time separation, the spot scheduler solver 110 is to honor the pin. The pinned spots may be allowed to violate time separation and conflict code constraints among themselves. For example, when the maximum number of allowable cars spots in a commercial break is one (1), but two (2) car spots have already been pinned to that commercial break, the car spots that are already pinned are allowed to stay in the commercial break. In such an instance, an unpinned car spot is not allowed to be scheduled for that commercial break. When, for example, the maximum number of allowable cars spots in a commercial break is three (3), not more than one additional unpinned car spot is allowed to be scheduled for that commercial break. Similar approaches may be followed when allowing pinned spots to violate time separation constraints.

As described above, the spot scheduler solver 110 in the television advertisement scheduling system 100 takes into account the characteristics of the commercial breaks and of their inventory buckets, as well as the constraints and requirements of the spots to be placed, and produces a commercial break schedule with the spots placed in accordance with the advertisers' requests.

Figure 3:
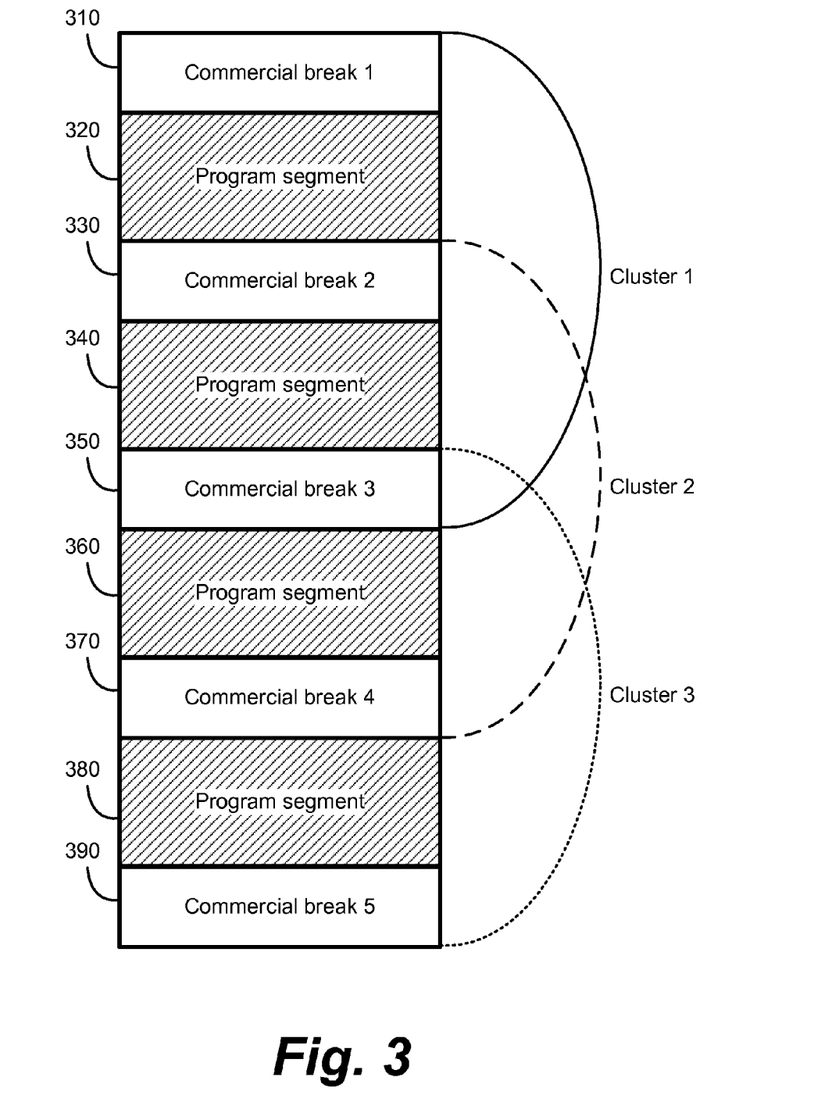
FIG. 3 is a diagram that illustrates exemplary clusters associated with the use of time separation constraints, in accordance with an embodiment of the invention.

FIG. 3 is a diagram that illustrates exemplary clusters associated with the use of time separation constraints, in accordance with an embodiment of the invention. Referring to FIG. 3, there are shown commercial breaks 310, 330, 350, 370, and 390, which are separated by program segments 320, 340, 360, and 380. The commercial breaks and program segments shown in FIG. 3 are provided to illustrate an example of how the spot scheduler solver 110 handles time separation constraints.

The time separation between any two spots can be the time between the beginnings of the two inventory buckets on which the spots have been placed. The time separation constraint may be modeled as a linear constraint. In a pre-processing step, the spot scheduler solver 110, for example, may generate clusters of commercial breaks containing consecutive inventory buckets within the selling title for a time span equal to the required time separation. For example, the time between the first and the last inventory bucket in each cluster may be less than the time separation required, but the time between the first two inventory buckets in two consecutive clusters may exceed the time separation required. The clusters generated by the spot scheduler solver 110 are pictured in FIG. 3. Cluster 1 is shown in a solid line and spans from the beginning of commercial break 1 (310) to the end of commercial break 3 (350). Cluster 2 is shown in a dashed line and spans from the beginning of commercial break 2 (330) to the end of commercial break 4 (370). Cluster 3 is shown in a dotted line and spans from the beginning of commercial break 3 (350) to the end of commercial break 5 (390). The time separation constraint in this example enforces no more than one spot to be scheduled per overlapping clusters. For example, if a spot is placed in commercial break 2 that belongs to both, cluster 1 and cluster 2 in FIG. 3, then the next spot may only be placed in the last commercial break that belongs to cluster 3, but not in any other commercial break that belongs to cluster 1 or to cluster 2.

Other time separation constraints, different from the one example shown in FIG. 3, may be implemented or utilized when placing one or more spots by the spot scheduler solver 110.

Figure 4A:
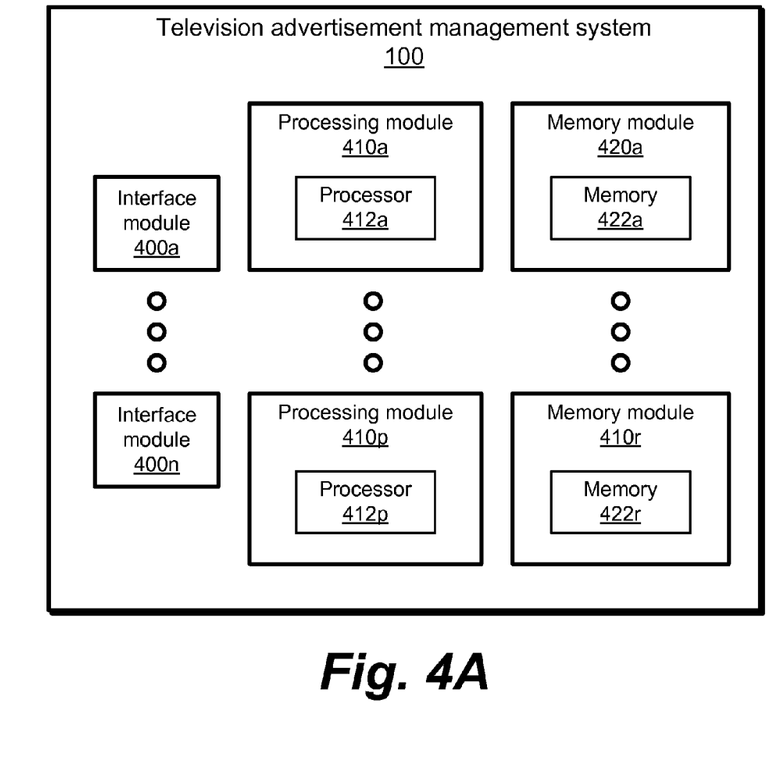
FIG. 4A is a block diagram that illustrates an exemplary television advertisement management system, in accordance with an embodiment of the invention.

FIG. 4A is a block diagram that illustrates an exemplary television advertisement scheduling system, in accordance with an embodiment of the invention. Referring to FIG. 4A, there is shown the television advertisement management system 100 described above with respect to FIG. 1. The television advertisement management system 100 may comprise interface modules $400a, \ldots, 400n$, processing modules $410a, \ldots, 410p$, and memory modules $420a, \ldots, 420r$. Each of these modules or components may interact with one or more of the other modules or components in the television advertisement management system 100.

Each of the interface modules $400a, \ldots, 400n$ may comprise suitable logic, circuitry, code, and/or interface that may be operable to communicate with one or more entities, applications, sources, systems, and/or networks external to the television advertisement management system 100. For example, the television advertisement management system 100 may communicate with the advertisers $130a, \ldots, 130n$ via one or more of the interface modules $400a, \ldots, 400n$.

Each of the processing modules $410a, \ldots, 410p$ may comprise suitable logic, circuitry, code, and/or interface that may be operable to process data. Each of the processing modules $410a, \ldots, 410p$ may comprise one or more processors such as central processing units (CPUs), digital signal processors (DSPs), custom data processors, or the like. For example, the processing module $410a$ may comprise a processor $412a$. Similarly, the processing module $410p$ may comprise a processor $412p$.

Each of the memory modules $420a, \ldots, 420r$ may comprise suitable logic, circuitry, code, and/or interface that may be operable to store data. Each of the memory modules $400a, \ldots, 400n$ may comprise one or more memory devices, which are based on one or more of DRAM, SRAM, Flash, and/or other memory technologies. For example, the memory module $420a$ may comprise a memory device $422a$. Similarly, the memory module $420r$ may comprise a memory device $422p$.

The spot scheduler solver 110 described above with respect to FIG. 1 may be implemented using one or more of the components of the television advertisement management system 100 shown in FIG. 4A. For example, the spot scheduler solver 110 may be implemented using IBM ILOG CPLEX (general purpose optimization software) and custom Microsoft .NET (general purpose software development software) code implemented in OPL (Optimization Programming Language) and C# respectively. These applications and/or programs, and the data used by them, may be stored in one or more of the memory modules $420a, \ldots, 420r$. Moreover, these applications and/or programs may be executed by one or more of the processors in the processing modules $410a, \ldots, 410p$.

Figure 4B:
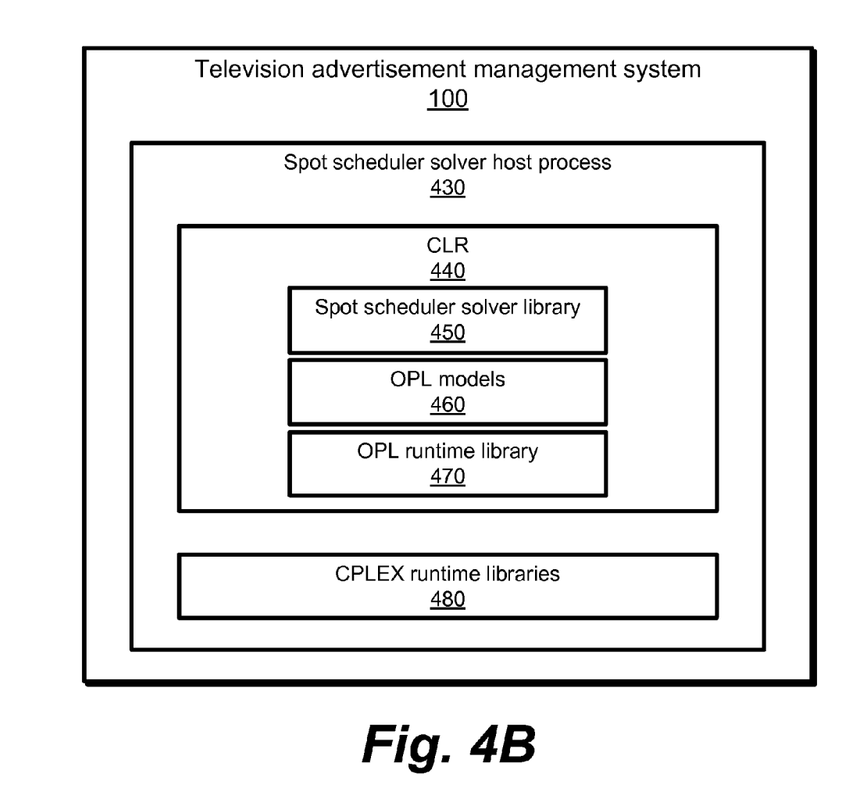
FIG. 4B is a block diagram that illustrates an exemplary architecture for a spot scheduler solver host process in the television advertisement management system of FIG. 4A, in accordance with an embodiment of the invention.

FIG. 4B is a block diagram that illustrates an exemplary architecture for a spot scheduler solver host process in the television advertisement management system of FIG. 4A, in accordance with an embodiment of the invention. Referring to FIG. 4B, there is shown the television advertisement management system 100 described above with respect to FIG. 1.

A spot scheduler solver host process 430 is also shown, which may be run or executed in the television advertisement management system 100. The spot scheduler solver host process 430 may be an implementation of the spot scheduler solver 110.

The spot scheduler solver host process 430 may be based on an executable program (e.g., SpotSchedulerSolverHost.exe), which may be run or executed using one or more of the modules or components described in FIG. 4A. The spot scheduler solver host process 430 may comprise a common language runtime (CLR) 440 and CPLEX runtime libraries 480. The CLR 440 may provide a runtime execution environment. For example, the CLR 440 may correspond to a virtual machine such as a virtual machine component in a .NET framework that is responsible for managing the execution of .NET programs. The CLR 440 may compile intermediate language code into machine instructions that are executed by one or more processors in the television advertisement management system 100. Moreover, the CLR 440 may provide other services that include, but need not be limited to, memory management and/or exception handling.

The CPLEX runtime libraries 480 may correspond to libraries used by a CPLEX Optimizer, such as the IBM ILOG CPLEX described above, for example. The CPLEX runtime libraries 480 may be based on dynamic-link library (DLL) files, for example.

The CLR 440 may provide a runtime execution environment for a spot scheduler solver library 450, OPL models 460, and an OPL runtime library 470. The spot scheduler solver library 450 may correspond to one or more libraries used to implement the functions and/or operations that correspond to the spot scheduler solver 110. The spot scheduler solver library 450 may be based on one or more DLL files (e.g. SpotSchedulerSolver.dll). The OPL Models 460 may correspond to one or more optimization scripts used to implement the functions and/or operations that correspond to the spot scheduler solver 110. The OPL runtime library 470 may correspond to one or more libraries used to implement the optimization scripts corresponding to the OPL Models 460. The OPL runtime library 470 may be based on one or more DLL files (e.g., OPLALL.dll).

The implementation described above enables the spot scheduler solver 110 to use advanced mathematical models and optimization applications to effectively and efficiently honor the advertiser's constraints and requirements. Nevertheless, the implementation of the spot scheduler solver 110 need not be so limited and other tools, applications, programming languages, and/or software architectures may be utilized to implement the functions and/or features of the spot scheduler solver 110 in the television advertisement management system 100.

In addition to honoring the constraints and requirements described above for each of the spots being placed, the spot scheduler solver 110 may also be operable to spread the spots from the same advertiser across days as much as possible.

When conflicts occur in the assignment or placement of spots into inventory buckets in commercial breaks, the spot scheduler solver 110 may place the spots according to two different priority schemes: a lead time scheme and a rate scheme.

The lead time scheme may be used by the spot scheduler solver 110 to place as many spots as possible while maintaining an arrival priority such that sports with a larger lead time are placed over spots with a smaller lead time. This may be a hard constraint, which means that even if a spot that came in first prevents further spot placement, that spot may need to be placed if there is room for it. The objective is to place as many spots as possible honoring all the constraints.

The rate scheme may be used by the spot scheduler solver 110 to place spots such that the sum of all spot rates, that is, the amount of money paid by advertisers, is maximized. Spots with an earlier arrival time may still have a higher priority, but this may be a soft constraint, that is, the objective remains to maximize the amount of money paid by advertisers while placing earlier spots when breaking ties.

When running, executing, or operating the spot scheduler solver 110 in the television advertisement management system 100, the running time is preferred to be as low as possible since the spot scheduler solver 110 may need to solve, in some instances, up to 30,000 spot placements per day. One approach to improve the speed of operation of the spot scheduler solver 110 is to implement its operation using a two-process model. In this regard, the two-process model that corresponds to the spot scheduler solver 110 may be implemented using one or more of the processors in the in the processing modules 410a, . . . , 410p shown in FIG. 4A.

The first process in the model may assign the spots to inventory buckets, while ensuring the constraints attached to the spots are fulfilled. To reduce the problem size, the spots having associated constraints other than associated billboards may be concatenated together and treated as a single spot with length equal to the sum of the participating spot lengths. The spots having piggyback constraints may be automatically placed in the same inventory bucket. However, to ensure solution feasibility for the rest of the associative constraints to be run in the next or second process in the model, the first process may need to address certain aspects of associated billboards, bookend constraints, and/or sandwich bookend constraints.

With respect to associated billboards, a spot corresponding to a billboard may not be placed in the same inventory bucket as a spot requiring any position. For bookend constraints, when a bookend spot is assigned to an inventory bucket, there should be at least a certain amount of time left after subtracting the concatenated bookend, any spots corresponding to the billboards and placed in the same inventory bucket, and any spots requiring first or last position. The amount of time left may be a programmable parameter that may be set to, for example, 15 seconds.

For sandwich bookend constraints, the same approach as with bookend constraints may be followed. In this instance, the programmable parameter may be set to, for example, 45 seconds. The sandwich bookend constraint, however, may not exclude the case of having an inventory bucket filled with 3 sandwich bookends and 2 piggybacks (one of 30 seconds, one of 15 seconds), which would not be feasible since the 2 piggybacks have to run back-to-back. That is, for the tight inventory buckets containing sandwich bookends, the model should add an additional constraint that ensures there are at least 2 spots other than associated with billboards or piggybacks or required first or last position.

The spot scheduler solver 110 may also address in the first process aspects related to requiring spots to be placed in certain positions in commercial breaks or in inventory buckets. For example, spots with the same position requirement may not be placed in the same inventory bucket. A spot requiring a first inventory bucket position and one requiring a first commercial break position may not be scheduled for the same inventory bucket. The same approach may be valid for all other combinations. Moreover, spots with associated billboards may not be placed in the same inventory bucket with spots that have position requirements.

During the first process, the spot scheduler solver 110 may also consider horizontal constraints (across days). These are typically soft constraints, that is, they need not interfere with the acceptance of the spots, but with the distribution of the accepted spots. The horizontal rotation may require that the accepted spots for a certain advertiser be as evenly distributed across days as possible. For example, if an advertiser has 20 spots to be scheduled any day during the week (Monday through Friday), then the spot scheduler solver 110 may determine a placement goal to be 4 spots for that advertiser per day. The horizontal constraint may be utilized by the spot scheduler solver 110 to determine the deviation from the desired number of spots per day and to minimize the deviation.

In the first process, one or more of the processors associated with the spot scheduler solver 110 may be utilized to run the lead time scheme iteratively. The orders may be grouped according to their arrival time. Each group of orders has spots prioritized according to their arrival time. All the spots in a particular order are typically given the same priority. The priorities may be chosen such that the sum of all priorities post a certain arrival time is less than the priority on any spot prior that certain arrival time.

The spot scheduler solver 110 may be first run for the spots in the first group of orders. The spots that may be placed in the first run may be hard constrained to be placed in a next or second run corresponding to a second group of orders. The second run may have the spots that were already placed in the first run (flagged as placed) and the spots from the second group of orders (flagged as new). The iterations may continue until all orders are run. In this instance, the spot scheduler solver 110 may maximize the number of spots placed from the spots flagged as new in each run.

For each group of orders that is run, the spots can have one of the following three states: currently placed, previously placed, or never placed. These attributes are used to place spots that have the same arrival time. Currently placed spots may take priority over previously placed spots, which in turn may take priority over never placed spots. Currently placed spots that have been placed may be placed in the subsequent runs as well. Previously placed spots that have been placed at some point, but due to schedule changes may have been unplaced, may be placed if there is room after the currently placed spots are placed. Never placed spots may be placed if there is room after the currently placed spots and the previously placed spots have been placed.

When the rate scheme is utilized, the spot scheduler solver 110 may run it in the first process. For spots with the same rates, the arrival time of the spots may be considered as a priority. However, the arrival time is treated as a soft constraint. The horizontal constraints may also be run in the first process by the spot scheduler solver 110 as an additional iteration after all spots have been placed. The placed spots may be hard constrained to be placed and the spot scheduler solver 110 tries to minimize the total deviation from the desired horizontal of the spots.

In addition to the first process described above, the two-process model that corresponds to the spot scheduler solver 110 may include a second or subsequent process. For example, the second process may utilize the output from the first process descried above, which has the spots assigned to each inventory bucket, and may rank the spots inside each inventory bucket such that the constraints associated with those spots are fulfilled.

The output of the second process may provide a ranking for each spot within each inventory bucket by their begin time. The begin time of each spot may be required to be higher or the same as the begin time of its corresponding inventory bucket, and less or the same as the end time of its corresponding inventory bucket. The constraints that are considered by the spot scheduler solver 110 during the second process may include, but need not be limited to, associative constraints, inventory bucket position constraints, and commercial break position constraints. That is, the spot scheduler solver 110 may consider those constraints that may be utilized to enforce a certain rank on the corresponding spot. The second process may ensure that there is at least one spot between the two spots belonging to a bookend, that there are at least two spots between each two of the three spots belonging to a sandwich bookend, and that piggyback spots are placed back-to-back. The second process may also ensure that national inventory type spots having an associated billboard inventory type spot may be placed in the first positions of the national inventory bucket if the billboard inventory bucket is on the top of the national inventory bucket, or last positions of the national inventory bucket if the billboard inventory bucket is on the bottom of the national inventory bucket. The constraints for the first and last inventory bucket or commercial break positions ensure that the begin time of the spot is either the begin time or the end time of its corresponding inventory bucket. The constraint for the second inventory bucket or commercial break position ensures that there is at most one spot before the spot being place. The constraint for the second to last inventory bucket or commercial position ensures that there is at most one spot after the spot to be placed.

While a two-process model is described above for the spot scheduler solver 110, the invention need not be so limited. Other models may be utilized in which the functions and/or operations of the spot scheduler solver 110 are implemented and/or organized using a different number of processes.

Figure 5:
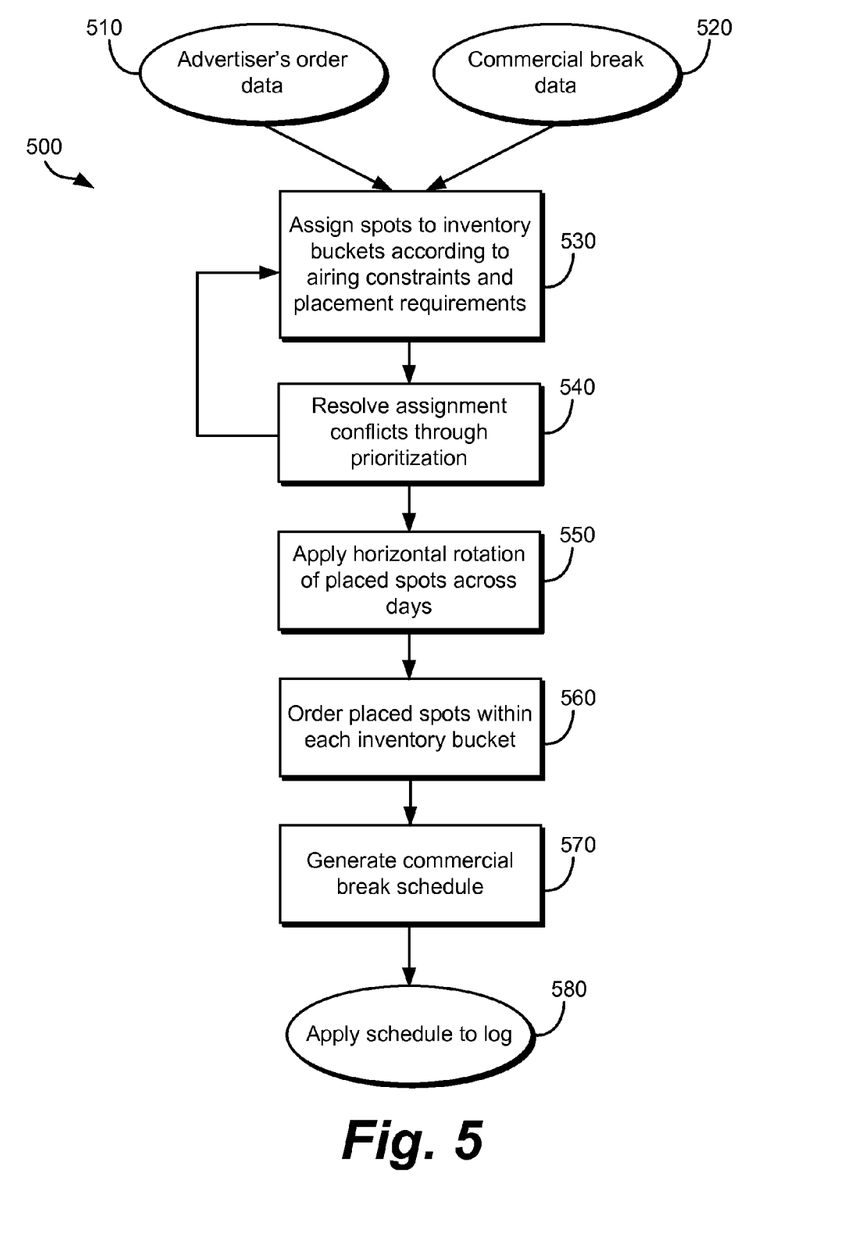
FIG. 5 is a flow diagram that illustrates exemplary steps for the placement of spots into commercial breaks, in accordance with an embodiment of the invention.

FIG. 5 is a flow diagram that illustrates exemplary steps for the placement of spots into commercial breaks, in accordance with an embodiment of the invention. Referring to FIG. 5, there is shown a flow chart 500 in which, at step 510, the spot scheduler solver 110 in the television advertisement management system 100 may receive an advertiser's order to place one or more spots into one or more commercial breaks, such as the commercial break 220, for example. The advertiser may be one of the advertisers 130a, . . . , 130n, shown in FIG. 1 and the order may be received by one or more of the interface modules 400a, . . . , 400n in the television advertisement management system 100. The advertiser's order may comprise airing constraints and placement requirements corresponding to the one or more spots.

At step 520, the spot scheduler solver 110 may receive commercial break data or attributes, also referred to as inventory, for example. New orders, changes to orders, and/or changes to the commercial break attributes may trigger the spot scheduler solver 110 to run or execute. At step 530, the spot scheduler solver 110 may assign each of the one or more spots to an inventory bucket within the one or more commercial breaks based on the airing constraints and placement requirements. In this regard, one or more of the processors associated with the spot scheduler solver 110 in the television advertisement management system 100 may be utilized to perform the assignment. The constraints corresponding to each of the one or more spots may comprise one or more of network constraints, selling title constraints, inventory type constraints, allowable date and time constraints, and advertiser conflict constraints. The placement requirements corresponding to each of the one or more spots may comprise one or more of associative constraints, position constraints, time separation constraints, franchise and/or title exclusion constraints, and spot pinning constraints. The associative constraints may define the positioning of any two or more spots relative to each other within the same inventory bucket or in adjacent inventory buckets. The position constraints may define the positioning of any one spot in an inventory bucket and/or in a commercial break.

At step 540, when at least one of the one or more spots is not assigned because of conflicts, the spot scheduler solver 110 may perform a prioritization scheme to complete the assignment of the one or more spots. In this regard, one or more of the processors associated with the spot scheduler solver 110 in the television advertisement management system 100 may be utilized to perform the prioritization scheme. The prioritization scheme may be one of the lead time scheme or the rate scheme described above. The spot scheduler solver 110 may go through the prioritization scheme and the assignment process until all spots are processed, that is, until each of the spots is placed or is determined that it may not be placed.

At step 550, the spot scheduler solver 110 may perform horizontal rotation on the spots that have been placed. At step 560, the spot scheduler solver 110 may order of spots according their position requirement within each inventory bucket.

At step 570, the spot scheduler solver 110 may generate a commercial break schedule based on the completed assignment of the one or more spots. In this regard, one or more of the processors associated with the spot scheduler solver 110 in the television advertisement management system 100 may be utilized to generate the commercial break schedule. The generated schedule may be applied to a log in step 580 by means of the television advertisement management system 100.

The steps described in FIG. 5 are presented by way of illustration and not of limitation. For example, some or all of the functions and/or processes of any one step may be combined with some or all of the functions and/or processes of another step. Such combination may result in more or fewer steps than those shown in FIG. 5. Other steps that may be performed by the spot scheduler solver 110 in connection with the flow chart 500 described in FIG. 5 may include maximizing the spread of days in which the one or more spots occur over the duration of the commercial break schedule. Moreover, the spot scheduler solver 110 may modify the generated commercial break schedule based on the completed assignment of the one or more spots and of one or more additional spots received in a subsequent order. These functions and/or processes may be performed by one or more of the processors associated with the spot scheduler solver 110 in the television advertisement management system 100.

In addition to the placement prioritization schemes listed above, the spot scheduler solver 100 may allow the use of custom processing instructions that the spot scheduler solver 100 is able to implement. The spots that are received for placement may have a corresponding processing instruction. A processing instruction may refer to a grouping of spots that get solved using one of the two prioritization schemes listed above. The processing instructions may be handled by one or more of the processors associated with the spot scheduler solver 110 in the television advertisement management system 100.

Figure 6:
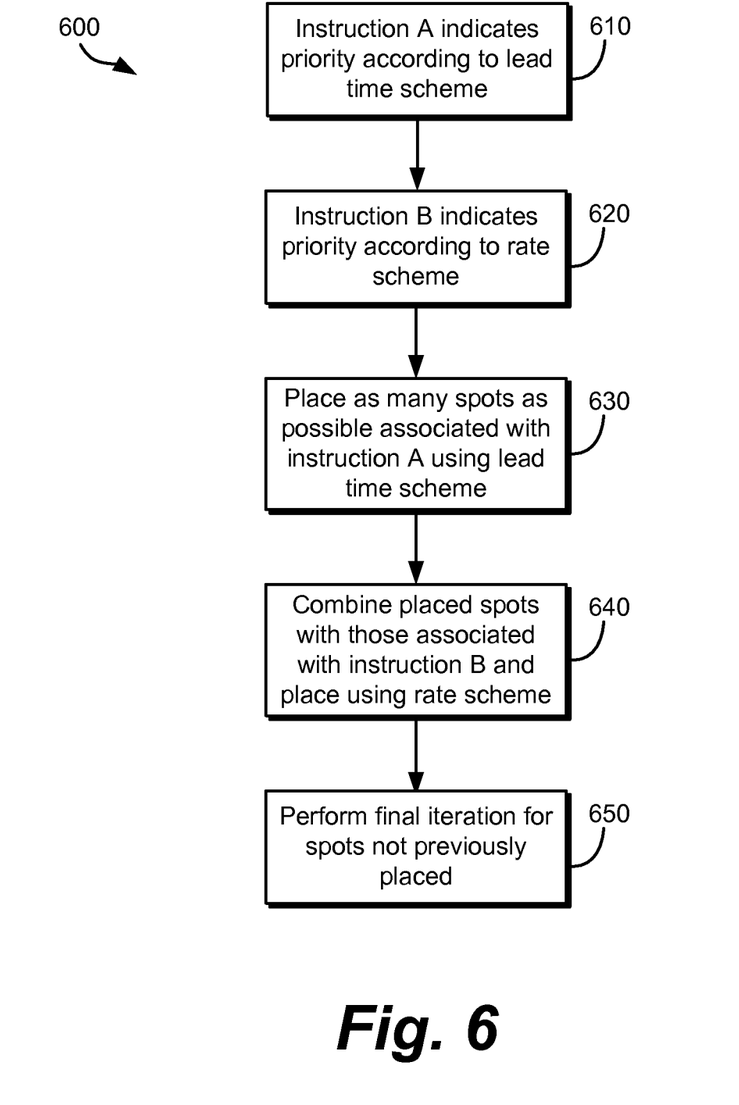
FIG. 6 is a flow diagram that illustrates exemplary steps in processing instructions associated with prioritization schemes used for the placement of spots into commercial breaks, in accordance with an embodiment of the invention.

FIG. 6 is a flow diagram that illustrates exemplary steps in processing instructions associated with prioritization schemes used for the placement of spots into commercial breaks, in accordance with an embodiment of the invention. Referring to FIG. 6, there is shown a flow chart 600 that describes an example of using processing instructions with the spot scheduler solver 100. For a particular set of spots to be solved, two processing instructions, instruction A and instruction B, may be provided. At step 610, instruction A indicates to place spots according to the lead time scheme described above. At step 620, instruction B indicates to place spots according to the rate scheme described above. In this example, 50% of the spots may correspond to instruction A and 50% may correspond to instruction B. At step 630, the spot scheduler solver 110 may place as many spots corresponding to instruction A as possible using the lead time prioritization scheme. At step 640, the resulting placed spots from step 630 may get combined by the spot scheduler solver 110 with the instruction B spots and solved again using the rate prioritization scheme associated with instruction B. In this regard, all of the spots are tossed up each time so that they may be placed anywhere in the inventory. At step 650, a final iteration may be performed by the spot scheduler solver 110 for any spots that were not associated with any processing instruction.

Another embodiment of the disclosure may provide a non-transitory machine and/or computer readable storage and/or media, having stored thereon, a machine code and/or a computer program having at least one code section executable by a machine and/or a computer, thereby causing the machine and/or computer to perform the steps as described herein for a spot scheduler solver.

In another embodiment of the invention, the spot scheduler solver 110 may also maximize the spread of spots within a day based on one or more vertical constraints. The vertical constraint operation may be similar to that used when considering time separation constraints. That is, having a desired number of spots per day for each advertiser, the spot scheduler solver 110 may determine a desired distance between two spots on each day by dividing the total number of inventory buckets on that day with the desired number of spots. The result may then be used then to calculate clusters as in the time separation constraint example shown in FIG. 3, and the deviation from having one spot per each such cluster may be minimized by the spot scheduler solver 110. This operation may be performed when, for example, the calculations necessary to spread spots within a day can be carried out within a certain pre-determined amount of time such that the commercial break schedule can be generated and subsequently applied to the log at the appropriate time.

Accordingly, the present disclosure may be realized in hardware, software, or a combination of hardware and software. The present disclosure may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method, comprising:
in a data processing system comprising one or more processors that are operable to process data:
receiving an advertiser's order to place one or more spots into one or more commercial breaks, wherein:
the advertiser's order comprises airing constraints and placement requirements corresponding to the one or more spots;
each of the one or more commercial breaks comprises a plurality of inventory buckets;
a position of each of the plurality of inventory buckets within each of the one or more commercial breaks defines a sequencing order of each of the inventory buckets within each of the one or more commercial breaks; and
each of the plurality of inventory buckets comprise a corresponding inventory type that indicates a type of content in each of the plurality of inventory buckets;
assigning each of the one or more spots to at least one of the plurality of inventory buckets that are within each of the one or more commercial breaks based on the airing constraints and placement requirements, wherein:
characteristics of the assigned at least one of the plurality of inventory buckets that are within each of the one or more commercial breaks are matched with the airing constraints and requirements of each of the one or more spots; and
the one or more spots that are within each of the assigned at least one of the plurality of inventory buckets that are within each of the one or more commercial breaks are ranked based on the matching such that the airing constraints and placement requirements corresponding to the one or more spots are fulfilled;
re-shuffling the one or more spots that are within each of the assigned at least one of the plurality of inventory buckets that are within each of the one or more commercial breaks;
when at least one of the one or more spots are not assigned to the at least one of the plurality of inventory buckets that are within each of the one or more commercial breaks because of conflicts, performing a prioritization scheme to complete the assignment of the one or more spots that are not assigned, wherein spots are prioritized based on arrival lead time, all spots for a particular order are given same priority, and priorities are chosen such that a sum of all priorities post a certain arrival time is less than a priority on any spot prior to the certain arrival time; and
generating a commercial break schedule based on the completed assignment of the one or more spots that are not assigned.

2. The method of claim 1, comprising maximizing the spread of days in which the one or more spots occur over the duration of the commercial break schedule.

3. The method of claim 1, comprising performing the prioritization scheme by maximizing the sum of the rates corresponding to the one or more spots.

4. The method of claim 1, wherein the airing constraints corresponding to each of the one or more spots comprise one or more of network constraints, selling title constraints, inventory type constraints, allowable date and time constraints, and advertiser conflict constraints.

5. The method of claim 1, wherein the placement requirements corresponding to each of the one or more spots comprise one or more of associative constraints, position constraints, time separation constraints, franchise and/or title exclusion constraints, and spot pinning constraints.

6. The method of claim 5, wherein the associative constraints define the positioning of any two or more spots relative to each other within the same one of the at least one of the plurality of inventory buckets or in adjacent inventory buckets.

7. The method of claim 5, wherein the position constraints define the positioning of any one spot in one of the at least one of the plurality of inventory buckets and/or in a commercial break.

8. The method of claim 1, comprising:
receiving an additional advertiser's order to place one or more additional spots into the one or more commercial breaks, wherein the additional advertiser's order comprises constraints and placement requirements corresponding to the one or more additional spots;
assigning each of the one or more spots and the one or more additional spots to at least one of the plurality of inventory buckets within the one or more commercial breaks based on the corresponding constraints and placement requirements; and
when at least one of the one or more spots and the one or more additional spots is not assigned because of conflicts, performing a prioritization scheme to complete the assignment of the at least one spot that is not assigned.

9. The method of claim 8, comprising modifying the generated commercial break schedule based on the completed assignment of the at least one spot that is not assigned.

10. A system, comprising:
a data processing system that is operable to:
receive an advertiser's order to place one or more spots into one or more commercial breaks, wherein:
the advertiser's order comprises airing constraints and placement requirements corresponding to the one or more spots;
each of the one or more commercial breaks comprises a plurality of inventory buckets;
a position of each of the plurality of inventory buckets within each of the one or more commercial breaks defines a sequencing order of each of the inventory buckets within each of the one or more commercial breaks; and
each of the plurality of inventory buckets comprise a corresponding inventory type that indicates a type of content in each of the plurality of inventory buckets;
assign each of the one or more spots to at least one of the plurality of inventory buckets that are within each of the one or more commercial breaks based on the airing constraints and placement requirements, wherein:
characteristics of the assigned at least one of the plurality of inventory buckets that are within each of the one or more commercial breaks are matched with the airing constraints and requirements of each of the one or more spots; and the one or more spots that are within each of the assigned at least one of the plurality of inventory buckets that are within each of the one or more commercial breaks are ranked based on the matching such that the airing constraints and placement requirements corresponding to the one or more spots are fulfilled;

re-shuffle the one or more spots that are within each of the assigned at least one of the plurality of inventory buckets that are within each of the one or more commercial breaks;

when at least one of the one or more spots are not assigned to the at least one of the plurality of inventory buckets that are within each of the one or more commercial breaks because of conflicts, performing a prioritization scheme to complete the assignment of the one or more spots that are not assigned, wherein spots are prioritized based on arrival lead time, all spots for a particular order are given same priority, and priorities are chosen such that a sum of all priorities post a certain arrival time is less than a priority on any spot prior to the certain arrival time; and generating a commercial break schedule based on the completed assignment of the one or more spots that are not assigned 11. The system of claim 10, wherein the data processing system is operable to maximize the spread of days in which the one or more spots occur over the duration of the commercial break schedule.

12. The system of claim 10, wherein the data processing system is operable to maximize the sum of the rates corresponding to the one or more spots when performing the prioritization scheme.

13. The system of claim 10, wherein the airing constraints corresponding to each of the one or more spots comprise one or more of network constraints, selling title constraints, inventory type constraints, allowable date and time constraints, and advertiser conflict constraints.

14. The system of claim 10, wherein the placement requirements corresponding to each of the one or more spots comprise one or more of associative constraints, position constraints, time separation constraints, franchise and/or title exclusion constraints, and spot pinning constraints.

15. The system of claim 14, wherein the associative constraints define the positioning of any two or more spots relative to each other within the same one of the at least one of the plurality of inventory buckets or in adjacent inventory buckets.

16. The system of claim 14, wherein the position constraints define the positioning of any one spot in one of the at least one of the plurality of inventory buckets and/or in a commercial break.

17. The system of claim 10, wherein the data processing system is operable to:

receive an additional advertiser's order to place one or more additional spots into the one or more commercial breaks, wherein the additional advertiser's order comprises constraints and placement requirements corresponding to the one or more additional spots;

assign each of the one or more spots and the one or more additional spots to at least one of the plurality of inventory buckets within the one or more commercial breaks based on the corresponding constraints and placement requirements; and when at least one of the one or more spots or at least one of the one or more additional spots is not assigned because of conflicts, perform a prioritization scheme to complete the assignment of the one or more spots and the one or more additional spots.

18. The system of claim 17, wherein the data processing system is operable to modify the generated commercial break schedule based on the completed assignment of the one or more spots and the one or more additional spots.

19. A non-transitory computer readable media having stored thereon a computer program having at least one code section for processing data, the at least one code section being executable by a computer to cause the computer to perform steps comprising:

in a data processing system comprising one or more processors that are operable to process data:

receiving an advertiser's order to place one or more spots into one or more commercial breaks, wherein:

the advertiser's order comprises airing constraints and placement requirements corresponding to the one or more spots;

each of the one or more commercial breaks comprises a plurality of inventory buckets;

a position of each of the plurality of inventory buckets within each of the one or more commercial breaks defines a sequencing order of each of the inventory buckets within each of the one or more commercial breaks; and each of the plurality of inventory buckets comprise a corresponding inventory type that indicates a type of content in each of the plurality of inventory buckets;

assigning each of the one or more spots to at least one of the plurality of inventory buckets that are within each of the one or more commercial breaks based on the airing constraints and placement requirements, wherein:

characteristics of the assigned at least one of the plurality of inventory buckets that are within each of the one or more commercial breaks are matched with the airing constraints and requirements of each of the one or more spots; and the one or more spots that are within each of the assigned at least one of the plurality of inventory buckets that are within each of the one or more commercial breaks are ranked based on the matching such that the airing constraints and placement requirements corresponding to the one or more spots are fulfilled;

re-shuffling the one or more spots that are within each of the assigned at least one of the plurality of inventory buckets that are within each of the one or more commercial breaks;

when at least one of the one or more spots are not assigned to the at least one of the plurality of inventory buckets that are within each of the one or more commercial breaks because of conflicts, performing a prioritization scheme to complete the assignment of the one or more spots that are not assigned, wherein spots are prioritized based on arrival lead time, all spots for a particular order are given same priority, and priorities are chosen such that a sum of all priorities post a certain arrival time is less than a priority on any spot prior to the certain arrival time; and generating a commercial break schedule based on the completed assignment of the one or more spots that are not assigned.

20. The non-transitory computer readable media of claim 19, wherein the at least one code section comprises code for maximizing the spread of days in which the one or more spots occur over the duration of the commercial break schedule.

21. The non-transitory computer readable media of claim 19, wherein the at least one code section comprises code for performing the prioritization scheme by maximizing the sum of the rates corresponding to the one or more spots.

22. The non-transitory computer readable media of claim 19, wherein the airing constraints corresponding to each of the one or more spots comprise one or more of network constraints, selling title constraints, inventory type constraints, allowable date and time constraints, and advertiser conflict constraints.

23. The non-transitory computer readable media of claim 19, wherein the placement requirements corresponding to each of the one or more spots comprise one or more of associative constraints, position constraints, time separation constraints, franchise and/or title exclusion constraints, and spot pinning constraints.

24. The non-transitory computer readable media of claim 23, wherein the associative constraints define the positioning of any two or more spots relative to each other within the same one of the at least one of the plurality of inventory buckets or in adjacent inventory buckets.

25. The non-transitory computer readable media of claim 23, wherein the position constraints define the positioning of any one spot in the at least one of the plurality of inventory buckets and/or in a commercial break.

26. The non-transitory computer readable media of claim 19, wherein the at least one code section comprises code for:
    receiving an additional advertiser's order to place one or more additional spots into the one or more commercial breaks, wherein the additional advertiser's order comprises constraints and placement requirements corresponding to the one or more additional spots;
    assigning each of the one or more spots and the one or more additional spots to at least one of the plurality of inventory buckets within the one or more commercial breaks based on the corresponding constraints and placement requirements; and
    when at least one of the one or more spots and the one or more additional spots is not assigned because of conflicts, performing a prioritization scheme to complete the assignment of the at least one spot that is not assigned.

27. The non-transitory computer readable media of claim 26, wherein the at least one code section comprises code for modifying the generated commercial break schedule based on the completed assignment of the at least one spot that is not assigned.

* * * * *